(12) United States Patent
Devadas et al.

(10) Patent No.: US 8,904,154 B2
(45) Date of Patent: Dec. 2, 2014

(54) EXECUTION MIGRATION

(75) Inventors: Srinivas Devadas, Lexington, MA (US);
Omer Khan, Framingham, MA (US);
Mieszko Lis, Cambridge, MA (US);
Keun Sup Shim, Cambridge, MA (US);
Myong Hyon Cho, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 648 days.

(21) Appl. No.: 13/087,712

(22) Filed: Apr. 15, 2011

(65) Prior Publication Data

US 2011/0258420 A1   Oct. 20, 2011

Related U.S. Application Data

(60) Provisional application No. 61/324,822, filed on Apr. 16, 2010, provisional application No. 61/454,660, filed on Mar. 21, 2011.

(51) Int. Cl.
*G06F 9/315* (2006.01)
*G06F 9/38* (2006.01)
*G06F 9/48* (2006.01)

(52) U.S. Cl.
CPC ............ *G06F 9/3824* (2013.01); *G06F 9/3851* (2013.01); *G06F 9/4856* (2013.01)
USPC ........................................................ 712/225

(58) Field of Classification Search
USPC ......................................................... 712/225
See application file for complete search history.

(56) References Cited

U.S. PATENT DOCUMENTS

| | | | | |
|---|---|---|---|---|
| 5,812,852 A | * | 9/1998 | Poulsen et al. ................ | 717/149 |
| 5,895,467 A | * | 4/1999 | Ubell et al. ........................... | 1/1 |
| 5,996,055 A | * | 11/1999 | Woodman ..................... | 711/203 |
| 6,243,788 B1 | * | 6/2001 | Franke et al. ..................... | 711/3 |
| 6,578,128 B1 | * | 6/2003 | Arsenault et al. ............. | 711/202 |
| 6,732,241 B2 | * | 5/2004 | Riedel ........................... | 711/154 |
| 7,380,039 B2 | * | 5/2008 | Miloushev et al. .......... | 710/244 |
| 7,665,089 B1 | * | 2/2010 | Vengerov ...................... | 718/102 |
| 7,934,035 B2 | * | 4/2011 | Miloushev et al. .......... | 710/244 |
| 8,397,219 B2 | * | 3/2013 | Vick et al. ..................... | 717/131 |
| 2003/0069920 A1 | | 4/2003 | Melvin et al. | |
| 2005/0027864 A1 | | 2/2005 | Bozak et al. | |
| 2005/0246502 A1 | * | 11/2005 | Joshi et al. .................... | 711/147 |
| 2007/0011429 A1 | * | 1/2007 | Sangili et al. ................. | 711/203 |
| 2008/0109624 A1 | * | 5/2008 | Gilbert et al. ................. | 711/163 |
| 2008/0196026 A1 | | 8/2008 | Azagury et al. | |
| 2010/0146513 A1 | * | 6/2010 | Song ............................. | 718/104 |
| 2010/0332771 A1 | * | 12/2010 | Gray et al. .................... | 711/148 |
| 2011/0247000 A1 | * | 10/2011 | Eidus et al. ................... | 718/104 |

\* cited by examiner

*Primary Examiner* — Aimee Li
(74) *Attorney, Agent, or Firm* — Occhiuti & Rohlicek LLP

(57) ABSTRACT

An execution migration approach includes bringing the computation to the locus of the data: when a memory instruction requests an address not cached by the current core, the execution context (current program counter, register values, etc.) moves to the core where the data is cached.

30 Claims, 4 Drawing Sheets

EXECUTION MIGRATION

CROSS-REFERENCE TO RELATED APPLICATIONS

This application claims the priority of U.S. Provisional Application No. 61/324,822, filed Apr. 16, 2010 and U.S. Provisional Application No. 61/454,660, filed Mar. 21, 2011, which are incorporated herein by reference.

BACKGROUND

This document relates to migration of execution in a multiple processor computing system.

The steady increases in processor performance obtainable from increasing clock frequencies have largely come to a halt in recent years at least in part because there is no cost-effective way to dissipate the heat generated by processors with extremely high clock frequencies. As a result, recent development efforts have favored multi-core parallelism. Commodity processors with four or eight cores on a single die have become common, and existing technology permits including many more processors on a single die. General-purpose single-die multiprocessors with as many as 64 cores are already commercially available. Even larger multi-core processors have been built, and it is possible that dies will soon include thousands of cores.

One major concern for multi-core processor designers is the design of a scalable memory subsystem for the processor. Increasing the number of concurrent threads requires a large aggregate memory bandwidth, but off-chip memory bandwidth grows with package pin density which scales much more slowly than on-die transistor density. Thus off chip memory bandwidth is severely constrained by the number of pins on an integrated circuit package. This constraint is known as the off-chip memory bandwidth wall. To address this problem, many multi-core processors integrate large private and shared caches on chip. The hope is that large caches can hold the working sets of the active threads, thereby reducing the number of off-chip memory accesses. Private caches, however, require a mechanism for maintaining coherency between caches, and shared caches do not general scale beyond a few cores.

Since shared caches do not scale, the distribution of many private caches close to processor cores is a preferred option in large-scale multi-core processors. In some approaches, each processor core is associated with a local cache, all other caches are considered as remote caches. Accessing remote cache lines is significantly slower than accessing local caches. The caches store data that is accessed by threads running on a core that is connected to the cache. In practice, this means that some form of memory coherence or other memory access control is generally needed. Creating memory coherence can create the illusion of a shared memory but scaling memory coherence algorithms to multi-core processors that include thousands of cores presents significant problems.

Some multi-core processors use bus-based cache coherence, which provides the illusion of a single, consistent memory space. However, bus-based cache coherence does not generally scale beyond a few cores. Other multi-core processors use directory-based cache coherence. Directory-based cache coherence is not subject to some of the limitations of buses, but can require complex states and protocols for efficiency even in relatively small multi-core processors. Furthermore, directory-based protocols can contribute significantly to the already costly delays of accessing off-chip memory because data replication limits the efficient use of cache resources. Additionally, directory-based protocols that have one large directory are often slow and consume large amounts of power. Finally, the area costs of keeping directory entries can be a large burden: if most of the directory is kept in off-chip memory, accesses will be too slow, but if the directory is stored in a fast on-chip memory, evictions from the directory cause thrashing in the per-core caches, also decreasing performance.

The abundance of interconnect bandwidth included with on-chip multi-core processors provides an opportunity for optimization. Existing electrical on-chip interconnect networks offer terabits per second of cross-section bandwidth with latencies growing with the diameter of the network (i.e., as the square root of the core count in meshes), and emerging 3D interconnect technologies enable high-bandwidth, low-latency on-chip networks. Optical interconnect technology, which offers high point-to-point bandwidth at little latency and with low power, is fast approaching miniaturization comparable to silicon circuits, with complete ring lasers no larger than 20 $\mu m^2$. Multi-core architectures featuring an on-chip optical interconnect have been proposed, but have so far been based on traditional cache-coherent memory architectures.

SUMMARY

In one aspect, in general, an execution migration approach includes bringing the computation to the locus of the data: when a memory access instruction (e.g., an instruction that comprises a data memory reference) requests data at an address not cached by the current core, the execution context (current program counter, register values, etc.) moves to the core where the data is cached.

In another aspect, in general, an instruction processor supports migration of execution from that processor to another processor in the same computing system upon occurrence of a particular class of instruction (e.g., a data memory access instruction). In some examples, the granularity of the execution migration is at an instruction level, which includes examples in which migration may be triggered when a particular memory or resource access instruction is encountered, and the point of migration is effectively at an instruction boundary (i.e., one instruction executes on one processor and the next instruction executes on another processor.)

In another aspect, in general, a multiple processor computing system includes an interface to a first memory, and multiple processing elements. Each processing element is associated with a corresponding second memory of a set of second memories. The processing elements together are configured to concurrently execute multiple tasks. Each second memory is associated with a corresponding set of memory locations of the first memory such that in operation each memory location in the sets of memory locations that is accessible from the processing elements is associated with at most one of the second memories.

Aspects can include one or more of the following features.

Communication paths, in some examples forming multi-hop network paths, couple the processing elements for passing execution context of tasks among the processing elements.

Each processing element includes an instruction processor configured to execute instructions that include memory access instructions referencing memory locations in the first memory.

Processing at a first processing element of a first task with a first memory access instruction that accesses a memory location in the set of memory locations corresponding to a different second processing element causes transfer of an execution context of the first task over the communication paths to the second processing element.

Processing at the first processing element of a second task with a second memory access instruction that accesses a memory location in the set of memory locations corresponding to the first processing element access to the memory location via the second memory associated with the first processing element.

Each of the second memories comprises a cache memory.

The system further includes the first memory, which has a capacity that exceeds the combined capacity of the plurality of second memories.

Each of the processing elements comprises a processing core of a multiple core integrated circuit, and each task comprises a thread, for example, threads associated with one or more applications.

The corresponding sets of memory locations of the first memory comprise sets of physical memory locations, or comprise sets of memory locations in a virtual address space.

Aspects may have one or more of the following advantages.

Providing access to a shared memory from a potentially large number of processors without requiring implementation (e.g., in hardware, procedures or protocols) of a complex cache coherency protocol provides the advantages of being able to utilize the multiple processors while still allowing different processing tasks to access shared portions of the memory.

Not requiring implementation of the cache coherency protocol can improve overall execution speed by avoiding latency associated with execution of a cache coherency protocol, for example, related to propagating changes to data values or invalidation messages from one cache to another cache, or relating to propagation of data invalidation messages and/or their confirmations between caches.

Cache utilization can be increased because a particular memory region is accessed (i.e., for read or write access) from one cache memory rather than being accessed from different cache memories, for example, by different processing instruction streams executing of different processors.

Future multi-core architectures will feature thousands of computation cores and copious inter-core bandwidth. To take advantage of this, the execution migration system avoids the latencies and implementation complexities of cache coherence protocols by making each computation core responsible for caching a segment of the address space. When a thread running on a given core refers to an address resident in some other core, the computation itself must move by having the two cores swap execution contexts.

Among other advantages, embodiments of the execution migration system take full advantage of spatio-temporal locality. This is an improvement relative to conventional processor architectures, which rely on cache coherence protocols.

Among other advantages, the embodiments of the execution migration system boosts the effectiveness of per-core caches while reducing hardware complexity by avoiding the use of cache coherence protocols.

Among other advantages, the absence of data sharing among caches improves cache efficiency by evicting fewer cache lines on average and increasing the effective size of the combined on-chip cache when compared to conventional cache coherence protocols.

Among other advantages, when several consecutive accesses are made to data assigned to a given core, migrating the execution context allows the thread to make a sequence of local accesses on the destination core rather than pay the performance penalty of remote accesses.

Conventional cache coherence in multi-core processors bring data to the locus of the computation that is to be performed on it (e.g., when a memory instruction refers to an address that is not locally cached, the instruction stalls while the cache coherence protocol brings the data to the local cache and ensures that the address can be safely shared (for loads) or exclusively owned (for stores)). In contrast, execution migration brings the computation to the locus of the data (e.g., when a memory instruction requests an address not cached by the current core, the execution context (current program counter, register values, etc.) moves to the core where the data is cached.

Other features and advantages of the invention are apparent from the following description, and from the claims.

DESCRIPTION

1 Overview

Conventional cache coherence in multi-core processors brings data to the locus of the computation that is to be performed on it. For example, when a memory instruction refers to an address that is not locally cached, the instruction stalls while the cache coherence protocol brings the data to the local cache and ensures that the address can be safely shared (for loads) or exclusively owned (for stores). The description below provides a number of embodiments of another approach for memory access in a multi-core processor, referred to as execution migration, in which computation is brought to the locus of the data. For example, when a memory instruction requests an address not cached by the current core by moving the execution context (e.g., current program counter, register values, etc.) to the core where the data is cached or otherwise accessible. In some embodiments, execution migration is combined with one or more additional memory access approaches, such as a remote access approach in which certain memory accesses are handled remotely at one core on behalf of another core, or a library approach in which portions of a memory are temporarily allocated (lent) for read and/or write access from one core to one or more other cores. The discussion below begins with a description of an embodiment that makes use of execution migration without also including remote access and/or library approaches.

Figure 1:
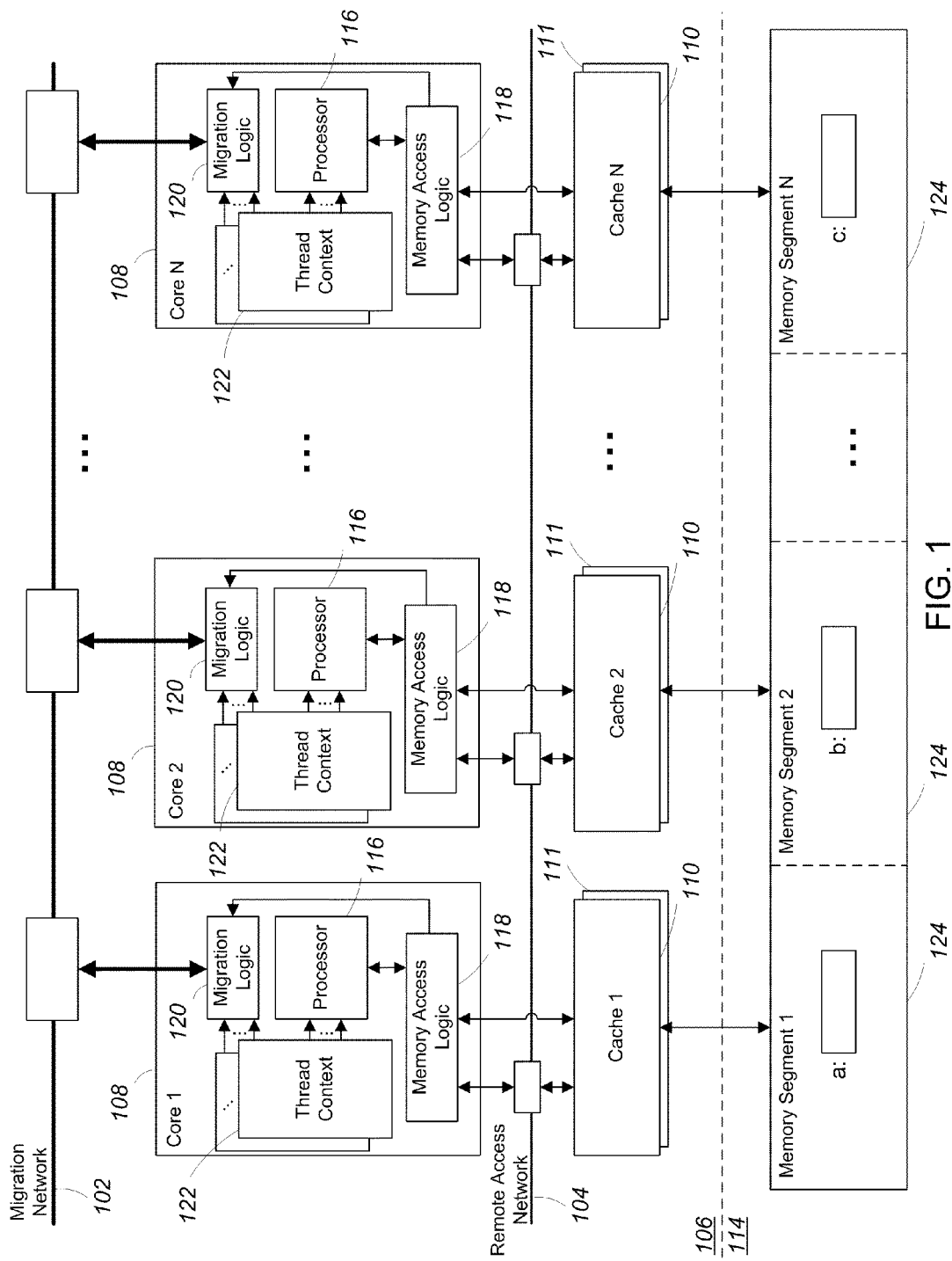
FIG. 1 is view of a multi-core processor that supports execution migration.

Referring to FIG. 1, a multi-core processor 106 accesses a physical memory 114 during concurrent execution of multiple tasks (e.g., threads) on the cores 108 of the multi-core processor 106. The address space provided by an external memory 114 in the system is divided among the processor cores 108, for example by dividing the address space into a number of segments 124, and associating each memory segment 124 with one core 108. Each core 108 has a cache memory 110 associated with it. Each core 108 is permitted to cache data from the external memory 114 in the segment(s) 124 of the memory associated with the core 108. Note that this arrangement is independent of how the off-chip memory is accessed, and applies equally well to a system with one central memory controller (not shown in FIG. 1) and to a hypothetical system where each core has its own external memory that is accessed independently.

Each processor core 108 includes a processor 116, storage elements for multiple thread contexts (i.e., architectural state) 122, and a memory access logic module 118. During execution of a thread, the processor 116 receives and executes instructions for a thread represented in the thread contexts 122, and when necessary requests read or write access to memory locations through the memory access logic module 118.

When the memory access logic module 118 receives requests from the processor 116 to access a memory location, for example, when the processor 116 at core #1 associated with a memory segment #1 executes a memory access instruction for a location, the memory access module 118 first determines the "home" core for that location. If the home core is the current core, for example, if location "a" is being accessed by core #1, then the memory access request is sent to the cache 110 for that core, possibly resulting in access to the external memory 114 to service that request.

Figure 2:
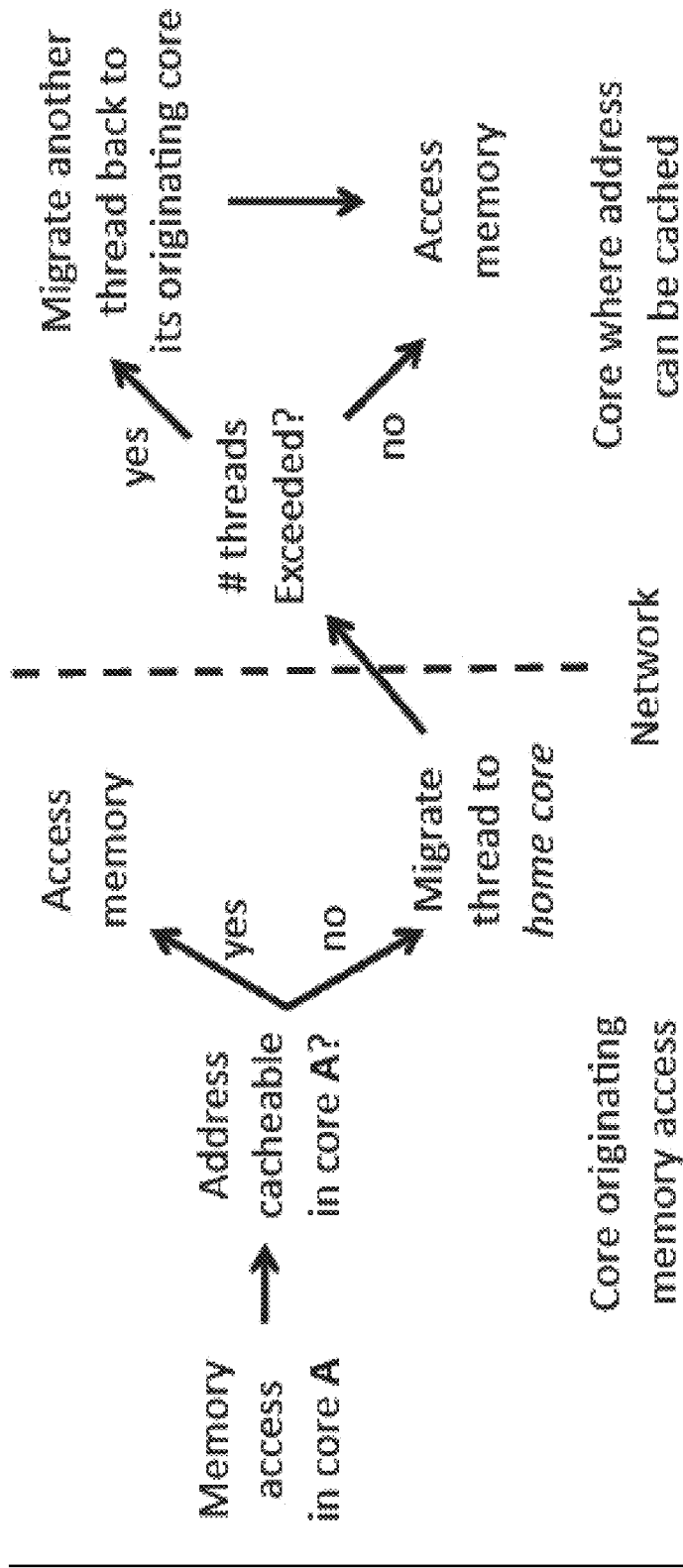
FIG. 2 is a flow chart showing the steps of an execution migration system.

On the other hand, if the home of the memory location is another core, for example, if core #1 is accessing location "b" in a memory segment associated with core #2, the execution of the thread on the core is interrupted, and the thread context for that thread is migrated to the home core for the memory location being accessed. For instance, the thread context for the thread accessing location "b" is migrated to core #2, and then execution of the thread is resumed. The memory request for location "b" is handled by the memory access logic 118 at core #2 and forwarded to the cache 110 associated with core #2. FIG. 2 is a generalized flow chart of this type of execution migration.

Because each address can be accessed via at most one cache 110, many operations that are complex in a traditional cache-coherent system become very simple: sequential consistency and memory coherence, for example, are trivially ensured, and locking reduces to preventing other threads from migrating to a specific core.

Migration of thread contexts uses a migration network 102, which couples all the cores 108. Migration logic 120 at each core 108 is coupled to the migration network 102, and is notified by the memory access logic 118 at the core 108 when a thread context must be migrated. As described above, the memory access logic 118 determines the home core 108 of the memory location being accessed, however more generally, in some embodiments the destination of the thread being migrated may be determined by the migration logic 120 or within the migration network 102. In some examples, the migration network 102 connects the processor cores 108 directly (allowing point to point migration). In other examples, the migration of a thread context between two cores requires multiple steps.

FIG. 1 also illustrates a remote access network 104, which is optional and is used in embodiments that also implement a remote access approach, as described in later section of this document. In some examples, the remote access network 104 is a physically separate network. In other examples, the remote access network 104 is a virtual network, for example, sharing physical resources with other networks on the processor. In some examples, an additional cache memory called a library cache 111 is associated with each processor core 108 for the purpose of caching data obtained through a library approach which is described in a later section of this document.

The following is an example of operation of the execution migration approach in the context of computing the arithmetic operation "a=b+c" where the value of "a" is stored at core #1 (i.e., in a memory segment associated with core #1), the value of "b" at core #2, and the value of "c" is stored at core #N, as illustrated in FIG. 1. An example of assembly code for a RISC-like machine may take the form:

load r1, b—loads memory location b into register r1
    load r2, c—loads memory location c into register r2
    add r3, r1, r2—r3 gets r1+r2
    store a, r3—stores the contents of r3 into memory location a Assuming that a, b, and c are stored in memory in segments 1, 2, and N as in FIG. 1, and that the thread is originally on core #1, the migrations caused by the memory instructions are as follows:

load r1, b—migrate from core 1 to core 2
    load r2, c—migrate from core 2 to core N
    add r3, r1, r2—executed on core N (no migration)
    store a, r3—migrate from core N to core 1

An optimizing compiler might decide to keep a, b, and c in registers over a period of time and thereby avoid the memory accesses, but it will eventually have to do the loads and stores, so this pattern is general.

For a stack-machine architecture, the equivalent assembly-level code would look like load b—pushes b onto the stack
    load c—pushes c onto the stack
    add—removes b, c from the stack, pushes b+c onto the stack
    store a—removes b+c from the stack, writes into a The migrations occur at the loads and stores as before. In the stack-machine case additional loads and stores could be generated if the stack overflows or underflows, which would generally result in migration of the thread to its home core, but in this illustrative case involving only the two entries on top of the stack that scenario is not discussed.

2 Execution Migration

The general approach described above can be embodied using a variety of approaches to controlling the migration of thread contexts between cores 108.

2.1 Swap Migration

In some embodiments, each core 108 has a single thread context storage 122, and a swap migration approach is used. When the thread migrates from, for example, a core A's thread context storage element 122 to a core B's thread context storage element 122, the thread context in core B's thread context storage element 122 is moved to core A's thread context storage 122 concurrently (i.e., the thread contexts are swapped). This approach ensures that multiple threads are not mapped to the same core 108, and requires no extra hardware resources to store multiple thread contexts. On the other hand, the thread context that originated in core B may well have to migrate back to core A at its next memory access, causing a thrashing effect. The swap migration approach also puts significantly more stress on the migration network 102: not only are the migrations symmetrical, the thrashing effect may well increase the frequency of migrations. A more significant issue that should be addressed is that swap migration can create deadlock under some circumstances.

2.2 One-Way Migration

In other embodiments, a one-way migration scheme is used in which multiple thread context storage elements 122 are included on any single core 108 and, therefore, in the previously described scenario, only the migration from core A to core B would be performed. In such embodiments, each core 108 has sufficient thread context storage elements 122 to store all thread contexts that are mapped to it. This approach reduces the strain on the migration network 102 and the total number of migrations, but requires additional hardware resources at core A to store multiple thread contexts. While it may appear that core A might now have to alternate among contexts and become a computational bottleneck, the reader should note that threads executing on core A are also accessing the memory cached by A, and would be subject to additional migrations in the swap migration approach.

In the one-way migration scheme, the number of thread contexts that can be stored on a single core 108 becomes an important consideration, as it affects both the hardware resources required to store the thread contexts (i.e., the number of thread context storage elements 122) and the computational power required at each core 108. In simulation experiments conducted using this scheme, the number of threads concurrently executing on a single core 108 generally did not exceed 8 at any given time. In some embodiments, each core 108 includes multiple processors 116, potentially allowing multiple threads to run in parallel.

2.3 Deadlock Avoidance

In some embodiments, execution migration systems are designed to avoid the possibility of deadlock in the execution migration network 102. Deadlock occurs when a thread context occupying a processor core blocks thread contexts that arrive over the migration network 102.

Figure 3:
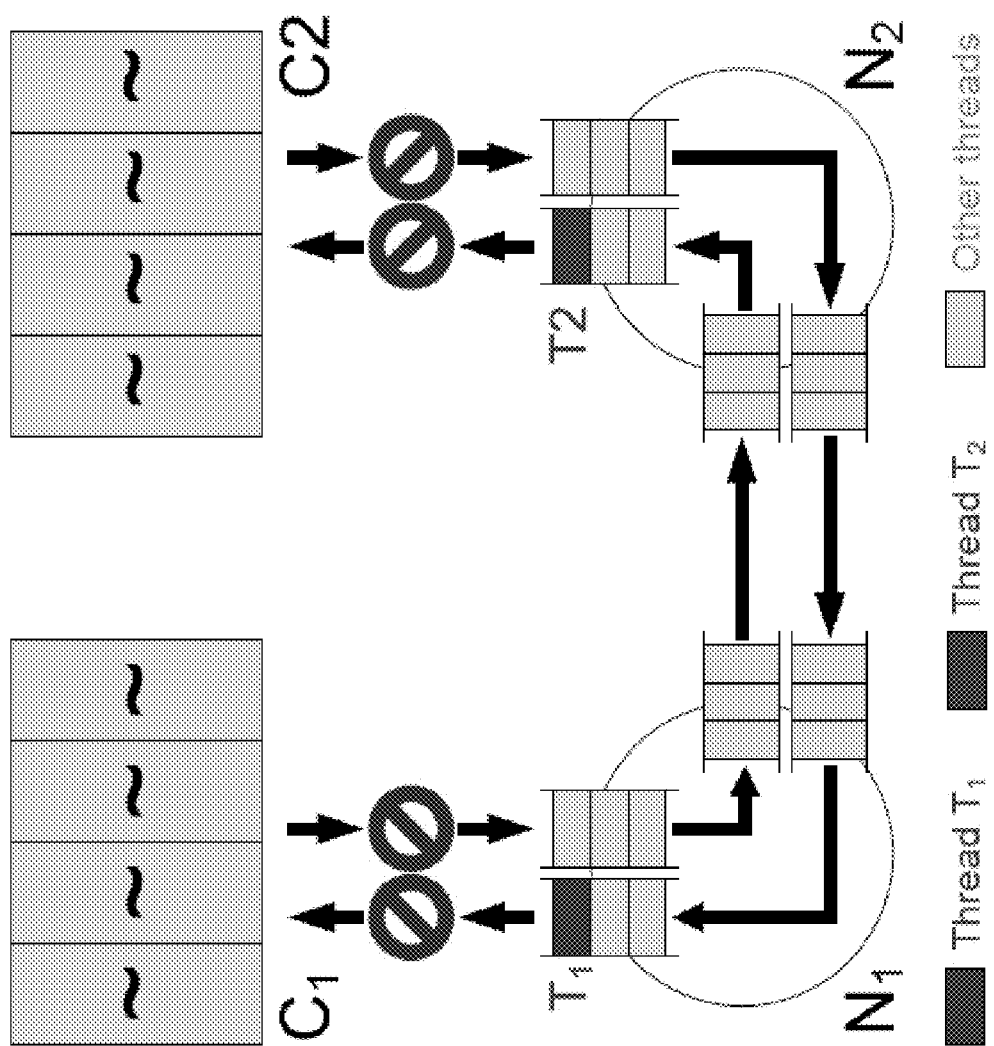
FIG. 3 is shows an example of execution migration deadlock.

Referring to FIG. 3, an example of execution migration deadlock between two processor cores is illustrated. In the example, a migrating thread $T_1$ is migrating to core $C_1$. When $T_1$ arrives at routing node $N_1$ of the migration network 102 directly attached to $C_1$, all the execution units of $C_1$ are occupied by other threads (:), and one of them must migrate to another core for $T_1$ to make progress. However, at the same time, thread $T_2$ is also blocked from migrating into core $C_2$, thus the contexts queued behind $T_2$ are backed up all the way to $C_1$ and prevent a $C_1$ thread from leaving the core. So $T_1$ cannot make progress, and the contexts queued behind it have backed up all the way to $C_2$, preventing any of $C_2$'s threads from leaving, completing a deadlock cycle.

2.3.1 Exclusive Native Context

In some examples, this type of deadlock can be avoided by establishing a safe path for evicted thread contexts. To establish the safe path, the execution migration system uses a set of policies in core scheduling, routing, and virtual channel allocation to implement an exclusive native context scheme.

Referring back to FIG. 1, each thread and its context are assigned as "native" to one particular core 108. The particular core 108 reserves a thread context storage element 122 exclusively for the context of the native thread, called a "native thread context storage." Other non-native thread contexts cannot occupy the native thread context storage even if the native thread context storage is not being used by the native thread context (hence the term 'Exclusive Native Context'). This means that a thread context storage element 122 is always available for a thread context to safely migrate back to the core where it is native without the possibility of deadlock.

Since a thread may migrate to an arbitrary core 108 where it is not native, each processor core 108 includes an additional thread context storage element 122 called a "guest thread context storage". The guest thread context storage is configured to accept migrating non-native thread contexts, which is necessary to enable migration since the native thread context storage of the arbitrary core is only available to the context of the native thread.

In operation, when a thread context is migrated from the thread context storage element 122 of one core, core A, to the thread context storage of another core, core B, if the migrated thread context is native to core B, the thread context is stored in the native thread context storage of core B. On the other hand, if the migrated thread context is not native to core B, any guest thread executing in core B is "evicted," causing its thread context be removed from the guest thread context storage and sent to the native thread context storage of its native core. The migrated thread context replaces the evicted thread context in the guest thread context storage of core B.

In some examples, an efficient fine-grain, migration-based architecture requires some level of multithreading in order to prevent performance degradation when multiple threads compete for the resources of the same core. In such examples, a core can include multiple native thread context storages that enable multiple native threads to be simultaneously associated with the core. The native thread context storages prevent the native threads from blocking one another. Similarly, a core 108 can include multiple guest thread context storages.

In some examples, if an arriving thread is not a native context of the core, it may be temporarily blocked by other non-native threads currently on the same core. The temporary blockage is due to a requirement that a thread can not be evicted unless it has executed at least one instruction since it arrived at the current core. Once at least one instruction has been executed, the new thread can evict the executing non-native thread and take the released resource. That is, an existing thread will be evicted by a new thread only if it has made some progress in its current visit on the core 108.

In some examples, the system adds further robustness to its deadlock avoidance system by distinguishing migrating traffic and evicted traffic: the former consists of threads that wish to migrate on their own because, for example, they wish to access resources in a remote core, while the latter corresponds to the threads that are evicted from a core by another arriving thread. In some examples, such an approach guarantees and/or is required to prove deadlock avoidance. These two migration channels can be implemented as virtual channels implemented using the migration network 102.

The operation, the migration system described in the preceding sections can execute as follows.

1. If a native context has arrived at a core and is waiting on the migration network, move it to a native thread context storage and proceed to Step 3.
2. a) If a non-native context is waiting on the migration network and there is an available guest thread context storage on the core, move the non-native context to the guest thread context storage and proceed to step 3.
   b) If a non-native context is waiting on the migration network and all of the guest thread context storages are full, choose one among the threads that have finished executing (or wait until one has finished executing) an at least one instruction on the core (No instructions should be in flight) and the threads that want to migrate to other cores. Send the chosen thread to its native core over the virtual channel set for evicted traffic. Then, advance to the next cycle. (No need for Step 3).
3. Among the threads that want to migrate to other cores, choose one and send it to the desired destination over the virtual channel set for migrating traffic. Then, advance to the next cycle.

3 Remote Access

In some embodiments, one or more of the migration approaches described above are combined with a second mode of memory access that does not require migration of the execution thread. For example, if a thread running on a processor core 108 needs access to data in a remote cache 110 (i.e., a cache associated with a different processor core 108), the memory access logic 110 at the processor core 108 has two choices: 1) either cause the thread to migrate to the home core of the data being accessed, or 2) perform a remote read or write.

To facilitate remote reads and writes, the multi-core processor 106 includes a remote access network 104, which provides a path from each core's 108 memory access logic 118 to every other core's cache 110. In some embodiments, this network is physically distinct from the migration network 102 that is used to pass thread contexts between cores 108. In other embodiments, the remote access network 104 shares underlying communication resources that link the cores 108.

As with the previously described execution migration approach, each memory segment is only accessed from one cache, therefore there is no need for expensive directories and coherence logic. This approach also has the advantage of increasing the effective size of on-chip cache since all on-chip data are distinct. Since data is only cached in one location, it may be far away from the processor core that the thread is currently running on.

To preserve memory coherence, remote reads are restricted to being word reads rather than larger block reads in order to maintain sequential memory semantics. Therefore, remote operations do not exploit spatial locality. For example, if a remote access were used to read a larger block of data from memory into a cache and then make a series of reads to the cached block, the data in the cached block would only be guaranteed to be coherent on the first read. In subsequent reads to the cached block of data, it would be possible that the data in the cache is not coherent with the data in memory due to, for example, a write having been performed on the data in memory.

On the other hand, migrating the thread to the remote core can exploit spatial locality because the entire thread context is migrated to the remote core and then executed there. There is a tradeoff in latency and energy between migrations and remote operations. Migration is a one-way trip for the context, whereas remote operations require a round trip (i.e., the request needs to be sent to the remote core, which then returns data in the case of a read or an acknowledgement in the case of a write).

In general, the thread context is much larger than word addresses and data, and migrations to a remote core may have longer or shorter latency than reads to the same core depending on the available network bandwidth, and the distance traveled. Thus, migrations may be faster than remote operations, but one migration consumes more energy than one remote operation. Qualitatively speaking, it makes sense to migrate to a remote core, if the thread is going to access multiple data items in the remote core, otherwise not. In some embodiments (described in a later section), this tradeoff is quantified in order to decide whether to migrate or not.

In some embodiments, the memory access logic answers the migrate-or-not question on a per-memory access basis for each thread. A number of different decision algorithms that are efficient to implement in hardware and which try to make correct decisions can be used.

3.1 Remote Access Operation

Figure 4:
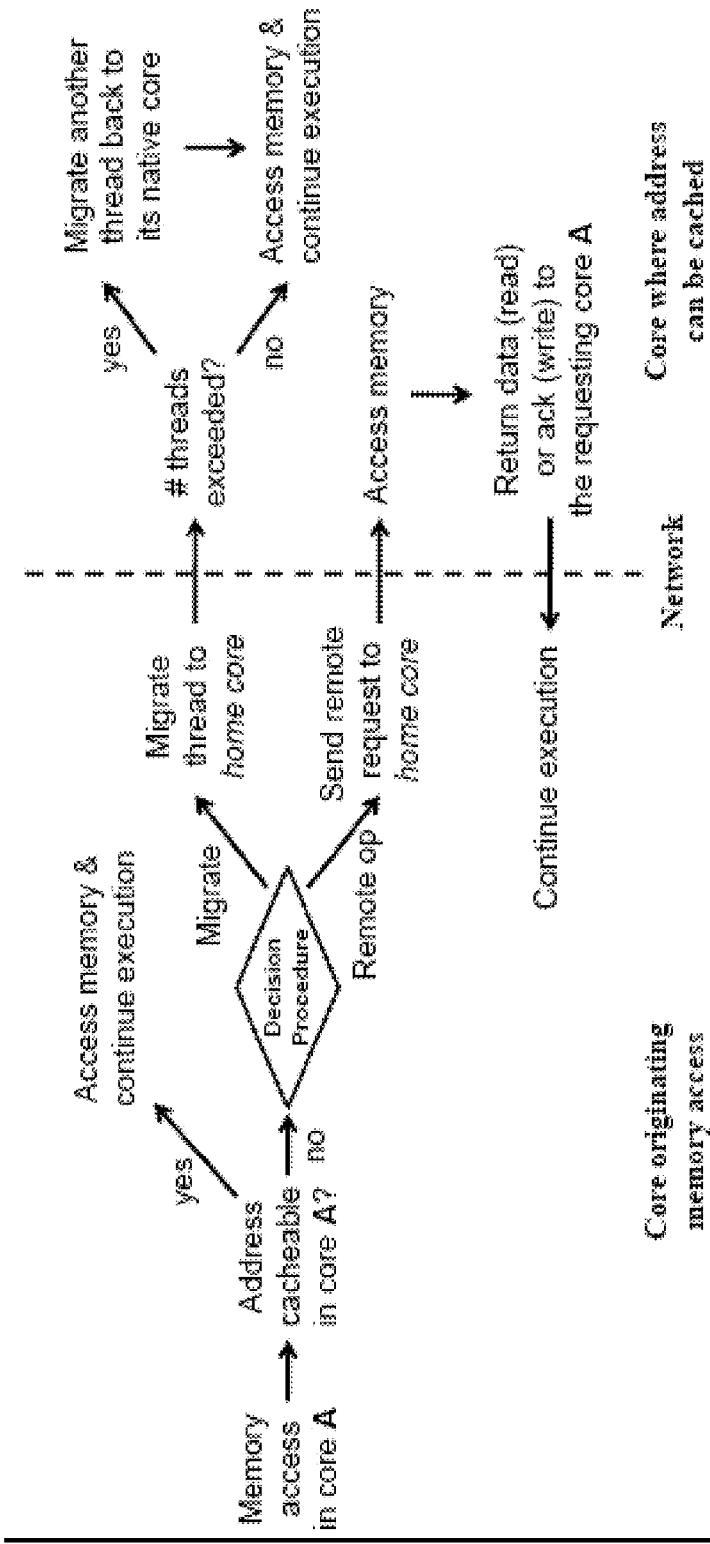
FIG. 4 is a flow chart showing the steps of an execution migration system that includes remote access.

Referring to FIG. 4, a flow chart includes and execution migration system and a remote access system that is implemented as described above. In some embodiments, the remote access system performs the steps of the flow chart as follows:

1. When a memory access is requested, first determine the processor core that is tasked with caching the memory location (i.e., the home core), for example by masking the appropriate bits.

2. If the core requesting access to the memory location is the home core for the memory location (i.e., the memory is cacheable by the requesting core):
   (a) forward the request for the memory location to the home core's cache hierarchy (possibly resulting in an external memory access);
3. If the core requesting access to the memory is not the home core for the memory location (i.e., the memory is not cacheable by the requesting core):
   (i) execute a decision procedure to decide whether to migrate or perform remote access. If the decision procedure chooses remote access:
     (a) send a remote access request for the memory location to the memory location's home core.
     (b) when the request arrives at the memory location's home core, forward it to the core's cache hierarchy (possibly resulting in a external memory access).
     (c) when the cache access completes, send a response back to the requesting core, the response including the data at the memory location.
     (d) once the response arrives at the requesting core, continue execution.
   (i) If the decision procedure chooses to migrate:
     (d) migrate as previously described.

Thus, performing the aforementioned steps allows a thread running on one core to remotely access memory locations that are cached by another core without the need for a cache coherence protocol.

3.2 Remote Access Decision

As was previously described, there is a tradeoff between using the remote access network to access a memory location and using using the migration network to move a thread context to the core that caches the memory location. Two heuristic schemes called the distance scheme and the history scheme can be used to implement a decision procedure that determines whether thread migration or remote access should be used.

3.2.1 Distance Scheme

In some examples, a distance scheme is used to determine whether a remote access or a thread migration should be performed. To make its determination, the distance scheme compares cost of thread migration (e.g., in cycles) to the cost of remote access (e.g., in cycles).

For example the cost of migration can be defined as:

$$\text{cost}_{migration}(s,d) = \text{numhops}(s,d) \times \text{cycperhop} + \text{loadlatency}$$

and the cost of remotely accessing memory can be defined as:

$$\text{cost}_{remoteop}(s,d) = 2 \times \text{numhops}(s,d) \times \text{cycperhop}$$

where s and d are the source core and the destination core, respectively and loadlatency corresponds to the latency of loading a thread context to and from the migration network 102.

The distance scheme decides to migrate the thread context if $\text{cost}_{migration} < \text{cost}_{remoteop}$ or if the home core is the native core. Otherwise, the distance scheme indicates that a remote access should be performed.

3.2.2 History Scheme

In other examples, a history based scheme is configured to migrate a thread to a remote core 108 if there are two consecutive memory accesses to the core 108. On the first memory access to the remote core 108, a remote read or write is performed over the remote access network 104. The second memory access to the remote core 108 causes the thread to migrate.

For example, when a core requests access to a memory address, the history based scheme may perform the following steps in deciding whether thread migration or remote access should be used:

```
if on native core
    if this is second consecutive request to access the memory address
        perform a thread migration
    else
        perform a remote access
else
    if the memory address is on the native core
        migrate
    else
        if a second consecutive request to the memory address is
        made
            migrate
        else
            perform a remote access
```

3.3 Remote Access Deadlock

To avoid interconnect deadlock, the system ensures that all remote requests must always eventually be served; specifically, the following sequence, involving execution core C, home core H, and memory controller M, must always eventually make progress:

1. remote access request C→H,
2. possible cache→external memory request H→M,
3. possible external memory→cache response M→H, and
4. remote access reply H→C.

Since each step can only block and occupy resources (e.g., buffers) until the following steps complete, network messages induced by each later step must not be blocked at the network level by messages from a previous step belonging to another remote access. First, because steps 2 and 3 are optional, avoiding livelock requires traffic to be split into two independent virtual networks: one carrying messages for steps 1 and 4, and one for steps 2 and 3. Next, within each such subnetwork, the reply must have higher priority than the request. Finally, network messages between any two nodes within each subnetwork must be delivered in the order in which they were sent. With these rules, responses are always consumed and never blocked by requests, and the protocol always eventually makes progress.

4 Library Approach

Some embodiments that make use of the basic execution migration approach, and in some cases also use the remote access approach, make use of an approach in which more than a single word is transferred for remote read or write operations. In contrast to conventional remote access, in a library approach, entire cache blocks are transferred between caches. Note that although described in the context of an execution migration approach, this library approach may be independently used in a multiprocessor system.

In order to maintain sequential semantics, when the block needs to be written, all copies of the block have to be invalidated as in a traditional cache coherence protocol. A traditional cache coherence protocol thus keeps track of all the sharers of a data block in a directory. The size of the directory typically grows with the number of cores since the number of sharers can in the worst case, be the all the cores.

The library approach makes use of timestamps associated with cache blocks that are "lent" to remote cores, and these blocks automatically expire according to their timestamps. This is similar to a e-library that lends books that automatically expire after a certain period of time. The advantage here is that there is no need for a directory to keep track of where all the copies are, and explicit invalidation messages do not need to be sent. Instead, a library of timestamps for the shared data blocks is maintained.

Again referring to FIG. 1, as in schemes described above, there is a unique home cache 110 for each data block. In the library scheme, a second "away" cache 111 is added to each core. In some implementations, the home and away caches can be merged. The system also has a single global timer/clock. This timer/clock can be slower than the processor clock; we merely require a unified notion of time across all the cores.

A data block can only be written in its home location. Read-only copies of data blocks with timestamps are stored in away caches at a core if the processor has made a request for a word in the data block. The requested word from the block is loaded into a register and used exactly as in the remote access approach. The block in the away cache is stored for as long as its timestamp is less than or equal to the current time; after that, it is evicted from the cache 111 or invalidated. The timestamp assigned to the data block is assigned by the home cache 110 prior to sending the block over. The home cache 110 keeps the information about the timestamps assigned to each data block that are stored in it. For any given data block, the home cache 110 just keeps information about the maximum value of the timestamp assigned to any copy of the data block. Any write request to the data block will not occur until the timestamp has expired. Writes are delayed until all the read copies of the data block have expired in their respective locations to maintain sequential semantics.

The following are the steps for a simple example. Assume a four-bit word address, with 2 words in each block. Call the current global time T.

1. Core A requests to read the word with address 1000 in the data block with address 100. (The block contains words 1000 and 1001.)
2. Data block 100 belongs to core/cache B. Core B sends back the data block to Core A along with the timestamp T+5 that it assigns to it. Core B stores the timestamp T+5 for the data block in its home cache.
3. Core C requests to read the word with address 1001 in the data block with address 100. Core B sends back the data block to core C along with the timestamp T+7, and updates the timestamp for the block in its home cache to be T+7.
4. Core D wishes to write the word with address 1000. The current time is T+3. Core B delays this request and only allows a write at time T+8 for later. By this time, the copies of the block in core A and C have expired.
5. Current time is T+8. Core A requests to read the word with 1000. It does not find it in its away cache because the corresponding block has been invalidated. It makes a request to core B for the data block and receives a data block with timestamp T+12.

4.1 Time Stamp Determination

The values of the timestamps are important. As can be seen from the above example, if a timestamp is far in the future, the data block will be alive in the remote cache for a longer time. This means that there may be more hits on the block. In the example shown, the block in core A expired and had to be requested again. However, if core B had given the block a later timestamp the write request by core D would have been delayed even more. There is thus a tradeoff between allowing fast reads (away cache hits on valid data) and not delaying writes (in the home cache).

In some examples, learning algorithms are used to adaptively change timestamps for particular data blocks. For example, data blocks that are rarely if ever written are assigned "long" timestamps and blocks that are frequently written are assigned "short" timestamps. It should be noted that the timestamp corresponds to an absolute time since it is compared to the global timer/clock.

5 Data Placement

The assignment of addresses to cores can affect the performance of approaches described above in at least three ways: (a) context migrations pause thread execution and therefore longer migration distances will slow down performance; (b) remote accesses also pause execution and longer round trip times will also limit performance; and (c) indirectly by influencing cache performance. On the one hand, spreading frequently used addresses evenly among the cores ensures that more addresses are cached in total, reducing cache miss rates and, consequently, off-chip memory access frequency; on the other hand, keeping addresses accessed by the same thread in the same core cache reduces migration rate and network traffic.

In some embodiments, the operating system (OS) controls memory-to-core mapping via the existing virtual memory mechanism: when a virtual address is first mapped to a physical page, the OS chooses where the relevant page should be cached by mapping the virtual page to a physical address range assigned to a specific core. Since the OS knows which thread causes a page fault, more sophisticated heuristics are possible: for example, in a first-touch-style scheme, the OS can map the page to the thread's native core, taking advantage of data access locality to reduce the migration rate while keeping the threads spread among cores.

6 Optimizations

6.1 Per Thread Heap Allocation

In some conventional systems, memory allocation is performed using a shared heap to allocate memory to any requesting threads without regard to page boundaries. Thus, consecutive memory segments are assigned to different threads in the order in which memory allocation calls were invoked. For execution migration systems this can result in false sharing (i.e., private data used by separate threads are likely to end up on the same physical page, causing the threads to contend for that core).

The execution migration system can ensure that all thread-local data allocated by a thread is mapped to that thread. This can be accomplished by causing the address-to-core mapping to occur at a memory page granularity. This facilitates optimal thread mapping by ensuring that memory allocation calls in separate threads allocate memory from separate pages.

6.2 Private Data Sharing

In some examples, data structures allocated contiguously by a programmer include sections of data that are private to a number of different threads.

To improve execution migration performance, the relevant data structure can be restructured. In most cases, such restructuring can only be done by the programmer, as the typical compiler would not, in general, be able to determine that different sections of the data structure are accessed by separate threads. In some examples, a programmer may segment a data structure into separate pages using a heuristic such as "mostly accessed in different subroutines," or by otherwise analyzing locality of access.

6.3 Read Sharing and Limited Replication

Some shared application data are written only once (or very rarely) and read many times by multiple threads. As was previously discussed, in a cache-coherent architecture, such data is replicated automatically in all user caches by the coherence protocol. However, in execution migration, each data element remains in the core it was mapped to, and threads not running on that core migrate to the core for access.

For example, several matrix transformation algorithms contain at their heart the pattern reflected by the following pseudocode:

for( ... ){ ... D1=D2+D3; ... } where D1 "belongs" to the running thread but D2 and D3 are owned by other threads and stored on other cores; this induces a pattern where the thread must migrate to load D2, then migrate to load D3, and then again to write the sum to D1.

This observation suggests an optimization strategy for execution migration: during time periods when shared data is read many times by several threads and not written, a programmer can make temporary local copies of the data and compute using the local copies:

// copy D2 and D3 to local L2, L3
for( ... ){ ... D1=L2+L3; ... }

Cache coherence protocols will do this blindly to all data regardless of how often it is read or written. However, in execution migration a programmer can use a profiler to keep track of the number of execution migrations for each code line, which tells the programmer which data are causing most migrations, and thus, better to be replicated. Since these local copies are guaranteed to be only read within the barriers by the programmer, there is no need to invalidate replicated data under our replication optimization.

7 Architecture

7.1 On-Chip Interconnect

In some examples, a multi-core system (e.g., a 64-core system) is connected by a 2D mesh interconnect (e.g., an 8-by-8 mesh). Each on-chip network router has enough network buffers to hold 4 thread contexts on each link with either 2 or 4 virtual channels. In some examples, each core has a context queue to hold arriving thread contexts when there are no available execution units. The processor cores can be Intel Atom-like x86 cores with execution contexts of 2 Kbits and enough network bandwidth to fit each context in four or eight flits (i.e., FLow control unITS, including control information and data).

8 Experimental and Simulation Results

Pin (a dynamic binary instrumentation framework that enables the creation of dynamic program analysis tools) and Graphite (a distributed parallel simulator for multicore processors) were used to model the execution migration architecture as well as the cache-coherent baseline. Pin enables runtime binary instrumentation of parallel programs and Graphite implements a tile-based multi-core, memory subsystem, and network, modeling performance and ensuring functional correctness.

The default settings used for the various system configuration parameters are summarized in the following table.

| Parameter | Settings |
| --- | --- |
| Cores | 64 in-order, 5-stage pipeline, single-issue 2-way fine-grain multithreading |
| L1 instr. cache per core | 32 KB, 4-way set assoc. |
| L1/L2 data cache per core | 16 KB/64 KB, 2/4-way set assoc. |
| Electrical network | 2D Mesh, XY routing |
| | 128b flits, 2 cycles/hop + congestion 1.5 Kbits context size |
| | Context load/unload: $\left\lceil \frac{pktsize}{flitsize} \right\rceil = 12$ cycles |
| | Context pipeline insertion = 3 cycle |

| Parameter | Settings |
|---|---|
| Data Placement | first-touch, 4 KB page size |
| Coherence protocol | Directory-based MOESI |
| Memory | 30 GB/s bandwidth, 75 ns latency |

8.1 On-Chip Interconnect

Experiments were performed using Graphite's model of an electrical mesh network with XY routing. Each packet on the network is partitioned into fixed size flits. Since modern network-on-chip routers are pipelined, modeling a 2-cycle per hop router latency is reasonable since 2- or even 1-cycle per hop router latencies have been demonstrated; appropriate pipeline latencies associated with delivering a packet were accounted for. In addition to the fixed per-hop latency, contention delays were modeled; the queuing delays at the router are estimated using a probabilistic model.

8.2 Area and Energy Estimation

A 32 nm process technology was used and CACTI was used to estimate the area requirements of the on-chip caches and interconnect routers. To estimate the area overhead of extra hardware context in the 2-way multithreaded core for execution, the Synopsys Design Compiler was used to synthesize the extra logic and register-based storage. CACTI was also used to estimate the dynamic energy consumption of the caches, routers, register files, and DRAM. Several energy counters were implemented (for example the number of DRAM reads and writes) in our simulation framework to estimate the total energy consumption of running benchmarks for both cache coherence and execution migration. Note that DRAM only models the energy consumption of the RAM and the I/O pads and pins will only add to the energy cost of going off-chip.

8.3 Measurements

Experiments were performed using an optimized version of Splash-2 benchmarks: fft, lu_contiguous, ocean_contiguous, raytrace, and water-$n^2$. The optimized versions of these benchmarks had significantly better data placement than the originals which improved results for the cache coherent baseline as well as execution migration.

Each application was run to completion using the recommended input set for the number of cores used, except as otherwise noted. For each simulation run, the total application completion time, the parallel work completion time, the percentage of memory accesses causing cache hierarchy misses, and the percentage of memory accesses causing migrations were tracked.

To exclude differences resulting from relative scheduling of Graphite threads, data were collected using a homogeneous cluster of machines.

8.4 Results 8.4.1 Area Comparisons

The area for the extra context in execution migration variants is almost exactly offset by the elimination of directories. This ignores the overhead of cache coherence logic, which for the MOESI protocol is substantially more complex than the migration logic.

8.4.2 Performance Comparisons

The parallel completion times for each of the benchmarks were compared. All heuristic variants of execution migration and remote access architectures outperform the cache-coherent baseline, with the distance and history schemes being the best.

8.4.3 Energy Comparisons

The energy consumption for each of the benchmarks was compared. The cache coherent baseline suffers from high off-chip miss rates, and the migration-only architecture suffers from significant energy consumption in the on-chip network. The remote access heuristic has the lowest energy consumption, however, it also has the lowest performance. The distance scheme, which combines execution migration and remote access, gives the best energy-performance tradeoff.

9 Implementations and Alternatives

In some examples, the execution migration system is not implemented on a single multi-core processor chip and is instead implemented as a distributed system. In some examples, the system could include multiple interconnected processor chips. In other examples, the system could be implemented using a network (e.g., within a data processing system, a local area network, or a wide area network) that includes local data storage at each locus of computation.

In some examples, the execution migration system can coexist with a range of the system memory being handled using conventional memory management schemes (e.g., cache coherency). Other methods such as software cache coherence can also be used. This can be useful especially for the instruction cache, because instructions are written very infrequently (generally whenever the program is first loaded into memory, and they usually don't change afterwards). If writes are infrequent like in this case, one might prefer the simplicity of not having any hardware coherence support, and accept the performance costs of performing write operations.

In some examples, the execution migration system can maintain cache coherence in a certain portion of the memory while conventional cache coherence algorithms maintain cache coherence in another portion of the memory. For example, a portion of the memory dedicated to storing processor instructions may be maintained using a conventional cache coherence algorithm.

In some examples, the architecture of the processor core can be described in a hardware definition language (HDL) such as Verilog. The processor core can be defined such that it is suitable for use in a larger multi-core processor.

In some examples, instead of a single cache, there are multiple levels of cache associated with each processor core.

In some examples, the execution migration system can utilize a predictive algorithm to predict that the next memory access will be at a remote core before the memory access instruction is actually executed. The execution context of the thread can then be migrated to the remote core before the instruction is executed.

In some examples, data accessed by a thread is associated with the threads native core to ensure that the thread's memory accesses are mostly local. However, in extreme cases this could mean that most or even a 11 data is allocated to the same core. Such a situation can result in high cache miss rates at the native core. In such a situation, the operating system can balance access locality with these types of effects on cache performance.

In the preceding description, the processor cores are shown arranged in a grid structure. In other examples, the cores can be arranged in a tree structure or any other topology. The data arrangement is designed according to the topology.

It is to be understood that the foregoing description is intended to illustrate and not to limit the scope of the invention, which is defined by the scope of the appended claims. Other embodiments are within the scope of the following claims.

What is claimed is:

1. A processing method comprising:
processing instructions for tasks at each of a plurality of processing circuit elements of a multiple processor system, the instructions including memory access instructions for accessing a memory having a plurality of disjoint regions, each region corresponding to a different processing circuit element of the plurality of processing circuit elements and corresponding to a different range of memory addresses of the memory, wherein the processing includes,
processing instructions for a first task by a first processing circuit element of the plurality of processing circuit elements, including processing memory access instructions, each memory access instruction for accessing data stored at a memory address in the memory, wherein at least some of the memory access instructions reference memory addresses in memory regions having a range of memory addresses other than the range of memory addresses corresponding to the first processing circuit element and at least some of the memory access instructions reference memory addresses in a memory region having a range of memory addresses corresponding to the first processing circuit element,
determining, by a memory access circuit of the first processing circuit element, a locus of execution of each of the memory access instructions before issuing the memory access instruction, the determining including, for each memory access instruction, comparing the memory address of the data accessed by the memory access instruction to the range of memory addresses corresponding to the region of the memory corresponding to the first processing circuit element, and
for at least some of the memory access instructions determined to have a locus of execution other than the first processing circuit element, transferring a locus of execution of the first task from the first processing circuit element to a different processing circuit element associated with the determined locus of execution.

2. The method of claim 1, wherein the different processing circuit element comprises a second processing circuit element and transferring the locus of execution of the first task from the first processing circuit element to the second processing circuit element includes transferring an execution context of the first task from the first processing circuit element to the second processing circuit element.

3. The method of claim 2, wherein transferring an execution context of the first task from the first processing circuit element to the second processing circuit element comprises transferring the execution context over a first communication network.

4. The method of claim 3, wherein each processing circuit element of the plurality of processing circuit elements includes a plurality of execution context storage elements.

5. The method of claim 4, wherein transferring the execution context of the first task from the first processing circuit element to the second processing circuit element further comprises transferring the execution context of the first task from a first execution context storage element of the plurality of execution context storage elements included in the first processing circuit element to a second execution context storage element of the plurality of execution context storage elements included in the second processing circuit element.

6. The method of claim 5, wherein transferring the execution context of the first task to the second execution context storage element causes an execution context of a second task to be transferred from the second execution storage element to the first execution storage element.

7. The method of claim 6, wherein the execution context of the first task is transferred over a migration communication channel of the first network and the execution context of the second task is transferred over an eviction communication channel of the first network.

8. The method of claim 4, wherein for each processing circuit element of the plurality of processing circuit elements, at least some of the plurality of execution context storage elements are reserved for execution contexts of tasks that are designated as native to the processing circuit element and the remainder of the plurality of execution context storage elements are reserved to contain execution contexts of tasks that are designated as guests to the processing circuit element.

9. The method of claim 8, wherein the execution context of the first task is native to the first processing circuit element and transferring the execution context of the first task to the second processing circuit element includes transferring the execution context of the task into an execution context storage element that is reserved for guest execution contexts.

10. The method of claim 9, wherein inserting the execution context of the first task into the guest execution context storage element includes determining if any of the second processing circuit element's guest contexts are unoccupied and if so, transferring the execution context into one of the unoccupied guest execution context storage elements.

11. The method of claim 9, wherein it is determined that all of the second processing circuit element's guest contexts are occupied and the execution context of a second task that occupies one of the execution context storage elements of the plurality of execution context storage elements of the second processing circuit element is evicted from the execution context storage element and the execution context of the first task is transferred into the newly unoccupied execution context storage element.

12. The method of claim 11, wherein the execution context of the second task is only evicted from the execution context storage element if the second task has processed at least one instruction at the second processing circuit element.

13. The method of claim 11, wherein the evicted execution context of the second task is transferred back to a processing circuit element of the plurality of processing circuit elements where its execution context is native.

14. The method of claim 13, wherein the first communication network includes an eviction communication channel for tasks transferring to a processing circuit element of the plurality of processing circuit elements where their execution contexts are native and a migration communication channel for tasks transferring to a processing circuit element of the plurality of processing circuit elements where their execution contexts are guests.

15. The method of claim 1, wherein for at least some of the memory access instructions referencing the memory region not corresponding to the first processing circuit element, remotely accessing the memory region.

16. The method of claim 15, wherein remotely accessing the memory includes accessing the memory region over a remote access network.

17. The method of claim 16, wherein accessing the memory region over the remote access network includes making a request to write data to the region of memory over the remote access network.

18. The method of claim 16, wherein accessing the memory region over the remote access network includes making a request for data from the region of memory over the remote access network and receiving the data from the region of memory over the remote access network.

19. The method of claim 15, comprising determining whether to remotely access the memory region or to transfer the locus of execution of the first task.

20. The method of claim 19, wherein determining whether to remotely access the memory region or to transfer the locus of execution of the first task comprises comparing an estimated cost of using the remote access network to an estimated cost of transferring the locus of execution.

21. The method of claim 20, wherein the cost comprises a number of cycles required for an operation.

22. The method of claim 19, wherein determining whether to access the memory region over the remote access network comprises analyzing a history of memory access instructions for the first task.

23. The method of claim 22, wherein a remote access operation is performed if the history of memory access instructions for the first task indicates that the same memory region is not being accessed consecutively.

24. The method of claim 1, wherein for at least some of the memory access instructions referencing the memory region not corresponding to the first processing circuit element, performing a library read to the memory and storing the result in a second memory associated with the first processing circuit element.

25. The method of claim 24, wherein the result of the library read includes a subset of the memory region and a timestamp indicating a time in the future.

26. The method of claim 25, wherein a system time is maintained and the subset of memory is valid until the system time exceeds the timestamp.

27. The method of claim 1 wherein the tasks comprises processing threads.

28. The method of claim 1 wherein the memory region comprises a physical memory region.

29. The method of claim 1 wherein the memory region comprises a virtual memory region.

30. A multiprocessor system configured to perform all of the steps of claim 1.

* * * * *

UNITED STATES PATENT AND TRADEMARK OFFICE
CERTIFICATE OF CORRECTION

PATENT NO. : 8,904,154 B2  Page 1 of 1
APPLICATION NO. : 13/087712
DATED : December 2, 2014
INVENTOR(S) : Srinivas Devadas et al.

It is certified that error appears in the above-identified patent and that said Letters Patent is hereby corrected as shown below:

In the Specification

Column 1, line 10, please insert a new paragraph and header immediately following the first paragraph as follows:

-- STATEMENT OF GOVERNMENT SUPPORT

This invention was made with Government support under Grant No. CCF1116372 awarded by the National Science Foundation. The Government has certain rights in the invention. --

Signed and Sealed this
Twenty-eighth Day of July, 2015

Michelle K. Lee
*Director of the United States Patent and Trademark Office*